(12) United States Patent
Rao et al.

(10) Patent No.: US 7,778,741 B2
(45) Date of Patent: *Aug. 17, 2010

(54) VEHICLE STABILITY CONTROL SYSTEM WITH TIRE MONITORING

(75) Inventors: Manoharprasad K. Rao, Novi, MI (US); Mark A. Cuddihy, New Boston, MI (US); Christopher R. Bujak, New Baltimore, MI (US)

(73) Assignee: Ford Global Technologies, Dearborn, MI (US)

( * ) Notice: Subject to any disclaimer, the term of this patent is extended or adjusted under 35 U.S.C. 154(b) by 523 days.

This patent is subject to a terminal disclaimer.

(21) Appl. No.: 11/693,131

(22) Filed: Mar. 29, 2007

(65) Prior Publication Data

US 2008/0243335 A1    Oct. 2, 2008

(51) Int. Cl.
*G05D 1/00*    (2006.01)
(52) U.S. Cl. .................... 701/1; 701/29; 701/38; 701/70; 340/440; 340/442
(58) Field of Classification Search .......... 701/1, 701/29, 38, 39, 41, 70, 71; 280/5.502; 340/440, 340/442
See application file for complete search history.

(56) References Cited

U.S. PATENT DOCUMENTS

| | | | |
|---|---|---|---|
| 6,278,361 B1 | 8/2001 | Magiawala et al. | |
| 6,397,127 B1 | 5/2002 | Meyers et al. | |
| 6,424,907 B1 | 7/2002 | Rieth et al. | |
| 7,020,552 B2 | 3/2006 | Park | |
| 2004/0064246 A1 | 4/2004 | Lu et al. | |
| 2005/0033459 A1 | 2/2005 | Otsuki et al. | |
| 2005/0033486 A1* | 2/2005 | Schmitt et al. | 701/1 |
| 2005/0033549 A1 | 2/2005 | Clark | |
| 2005/0038589 A1 | 2/2005 | Shukla | |
| 2005/0085987 A1 | 4/2005 | Yokota et al. | |
| 2005/0090938 A1 | 4/2005 | Ranelli | |
| 2005/0154509 A1 | 7/2005 | Schubert et al. | |
| 2006/0027412 A1 | 2/2006 | Geborek | |
| 2006/0041336 A1 | 2/2006 | Schubert et al. | |
| 2006/0064218 A1 | 3/2006 | Subbian et al. | |
| 2006/0136111 A1 | 6/2006 | Robert et al. | |
| 2006/0267750 A1* | 11/2006 | Lu et al. | 340/440 |

FOREIGN PATENT DOCUMENTS

WO    2005095133 A1    10/2005

* cited by examiner

*Primary Examiner*—Gertrude Arthur Jeanglaud
(74) *Attorney, Agent, or Firm*—Angela M. Brunettil; Fredrick Owens

(57) ABSTRACT

A control system (10) for a vehicle (16) includes a sensor (35-47) that generates a sensor signal and a stability control system (26). Tire monitoring sensors (20) in each wheel generate tire signals including temperature, pressure and acceleration. The controller (26) is coupled to the sensors (20, 25-47), and generates a first roll condition signal as a function of the sensor signal, and generates a second roll condition signal as a function of the tire signals. The first or second roll condition signals control the rollover control system to mitigate a vehicle rollover event.

22 Claims, 6 Drawing Sheets

VEHICLE STABILITY CONTROL SYSTEM WITH TIRE MONITORING

TECHNICAL FIELD

The present invention relates generally to vehicle stability control systems and tire monitoring systems. More particularly, the present invention is related to improving rollover detection by signal analysis of tire pressure, temperature and acceleration data.

BACKGROUND

Stability control systems currently exist in various forms such as electronic stability control systems (ESC), yaw stability control systems (YSC), and roll stability control systems (RSC). Such systems are used to maintain controlled and stable vehicle operations for improved vehicle and occupant safety. Stability control systems are often used to maintain vehicle traction and to prevent or mitigate a rollover event.

Current stability control systems are well adapted for ride comfort and road handling. The sensing systems for detecting rollover events rely on yaw and roll rate sensors and accelerometers to determine if the vehicle has exceeded the limits of lateral stability. These systems work well for rollover scenarios that do not involve significant lateral forces, referred to as untripped rollover events. However, tripped rollover events, such as hitting a curb while sliding laterally, generate significant lateral forces which can move an occupant outboard, often before the vehicle has experienced enough roll angle to be detected by the roll and yaw sensors. Thus, conventional stability control systems are limited in their ability to mitigate and prevent tripped rollover events.

Stability control systems typically mitigate rollover events by aggressively increasing the brake fluid pressure to quickly brake one or more tires. The braking counteracts the forces experienced during such an event, thereby, stabilizing the vehicle. When tire pressure is low, however, such RSC system interventions can be less effective and even lead to tire-debeading. The term "tire-debeading" refers to the separation of the bead wire from a tire and thus the breakdown of that tire. Debeading of a tire can result in rim or wheel contact with a road surface and resultant vehicle instability.

Thus, there exists a need for an improved stability control system, which overcomes the limitations of current stability control systems to detect tripped rollover events. There also exists a need for an improved stability control system that accounts for low tire pressure situations.

SUMMARY OF THE INVENTION

One embodiment of the present invention provides a control system for a vehicle that includes a tire sensor located within a wheel of the vehicle and generating a tire signal comprising pressure, temperature and acceleration data; at least one vehicle dynamics sensor generating a sensor signal; a rollover control system; and a controller communicating with the tire sensor and the at least one vehicle dynamics sensor. The controller generates a first roll condition signal as a function of the sensor signal, and a second roll condition signal as a function of the tire signal. The first or second roll condition signals control the rollover control system to mitigate a vehicle rollover event. The first roll condition signal can indicate a non-tripped rollover event, and the second roll condition signal can indicate a tripped rollover event. Thus, the improved tire sensing data can be independently and simultaneously analyzed to determine a rollover event.

In another example, the controller generates the second roll condition signal as a function of the tire signal by comparing frequency response characteristics of the tire signal to stored frequency response characteristics indicative of a rollover event. Alternatively, or additionally, the controller generates the second roll condition signal as a function of the tire signal by comparing amplitude response characteristics of the tire signal to stored amplitude response characteristics indicative of a rollover event.

In a further embodiment, the second roll condition signal includes a pre-arm roll condition signal. The pre-arm roll condition signal is derived from the tire sensor data, and informs the rollover control system of the status of the tires. Thus, in cases where tire pressure is low, for example, the rollover system may need to lower the rollover detection thresholds and/or pre-arm the braking system earlier in the countermeasure scheme to be effective. In other words, when a rollover is not declared on the basis of the tire sensors, the information may still aide the rollover control. That is, the pre-arm roll condition signal modifies control of the rollover control system in the presence of the first roll condition signal to mitigate a vehicle rollover event. This may be accomplished by modifying control of the rollover control system by lowering thresholds indicative of a rollover event.

In another embodiment, the controller communicates with the tire sensors at least partly by wireless transmission, as each tire sensor is located within a tire of the vehicle.

In another embodiment of the present invention, a control system for a vehicle is provided which includes a tire sensor located within a wheel of the vehicle and generating a tire signal comprising pressure, temperature and acceleration data; at least one vehicle dynamics sensor generating a sensor signal; a stability control system; at least one brake coupled to the stability control system and associated with the wheel of the vehicle; and a controller coupled to the at least one vehicle dynamics sensor and the tire sensor. The controller has a plurality of tire pressure associated brake control ranges. It detects an unstable event in response to the sensor signal and the tire signal, and applies a brake pressure in response to the tire signal and the plurality of tire pressure associated brake control ranges via the stability control system. In one example, the plurality of tire pressure associated brake control ranges include: a full brake control range; a reduced brake control range; and an inactive brake control range. Thus, for example, with knowledge of each tire status, the controller can maintain full brake control functions when each tire pressure signal is greater than a threshold. The controller can also determine a slip level of at least one wheel of the vehicle from the tire signal, and in response thereto, adjust the applied brake pressure.

In another example, the at least one vehicle dynamics sensor is selected from an acceleration sensor, a roll rate sensor, a yaw rate sensor, and a pitch rate sensor.

Yet another embodiment of the present invention provides a control system for a vehicle that includes a tire sensor located within each wheel of the vehicle and generating a tire signal comprising pressure, temperature and acceleration data; at least one vehicle dynamics sensor generating a sensor signal; a rollover control system; and a controller wirelessly communicating with each tire sensor and the at least one vehicle dynamics sensor. The controller generates a first roll condition signal as a function of the sensor signal, and a second roll condition signal as a function of the tire signal. The first or second roll condition signals control the rollover control system to mitigate a vehicle rollover event. Further, the controller generates the second roll condition signal as a function of the tire signal by comparing frequency response characteristics of the tire signal to stored frequency response characteristics indicative of a rollover event, or by comparing amplitude response characteristics of the tire signal to stored amplitude response characteristics Indicative of a rollover event.

The embodiments of the present invention provide several advantages. One advantage provided by an embodiment of the present invention is a stability control system that is capable of obtaining tire pressure and acceleration knowledge and adjusting stability control functions accordingly.

Another advantage provided by an embodiment of the present invention is a stability control system that reduces the amount of brake pressure applied according to measured tire pressure and other data to improve system response and effectiveness, including preventing tire-debeading.

Yet another advantage provided by another embodiment of the present invention is a control system that allows for quicker or earlier and softer stability control interventions at low tire pressure or slip levels.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION

Figure 1:
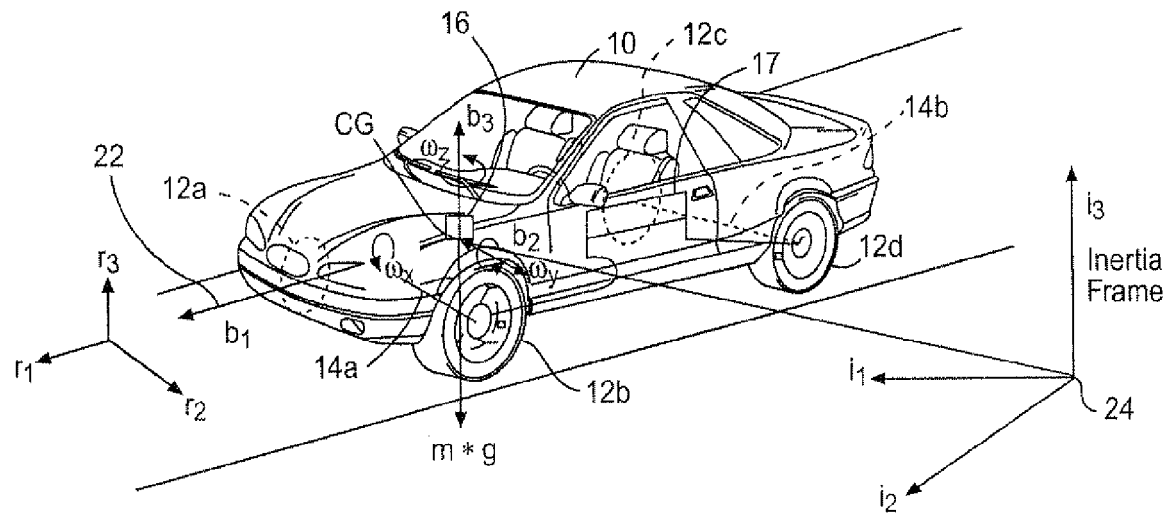
FIG. 1 is a block diagrammatic and perspective view of a vehicle with variable vectors and coordinate frames in accordance with an embodiment of the present invention.

In the following figures, the same reference numerals will be used to identify the same components. The present invention may be used in conjunction with vehicle control systems including a yaw stability control (YSC) system, roll stability control (RSC) system, lateral stability control (LSC) system, integrated stability control (ISC) system, or a total vehicle control system for achieving desired vehicle performance. The present invention is also described with respect to an integrated sensing system (ISS), which uses a centralized motion sensor cluster such as an inertial measurement unit (IMU) and other available, but decentralized, sensors. Although a centralized motion sensor, such as an IMU, is primarily described, the techniques described herein are easily transferable to using the other discrete sensors.

In the following description, various operating parameters and components are described for several constructed embodiments. These specific parameters and components are included as examples and are not meant to be limiting.

Referring to FIG. 1, an automotive vehicle 10 with a safety control system of the present invention is illustrated with the various forces and moments thereon during a rollover condition or a post collision event. Vehicle 10 has front right (FRW) and front left (FLW) wheel/tires 12a and 12b and rear right (RRW) wheel/tires 12c and rear left (RLW) wheel/tires 12d, respectively. The vehicle 10 may also have a number of different types of front steering systems 14a and rear steering systems 14b, including having each of the front and rear wheels 12a, 12b, 12c and 12d configured with a respective controllable actuator, the front and rear wheels 12 having a conventional type system in which both of the front wheels 12a, 12b are controlled together and both of the rear wheels 12c, 12d are controlled together, a system having conventional front steering and independently controllable rear steering for each of the wheels 12c and 12d, or vice versa. Generally, the vehicle 10 has a weight represented as Mg at the center of gravity of the vehicle 10, where g=9.8 m/s² and M is the total mass of the vehicle 10.

The control system 11 has rollover mitigation and prevention systems, which include and/or comprise of active/semi-active suspension systems, an active steering system, a deployable lateral stability system, inwardly mounted wheel assemblies, and other related devices such as known in the art. The control system 11 may also be used with or include an anti-roll bar, or airbags or other safety devices deployed or activated upon sensing predetermined dynamic conditions of the vehicle 10.

The control system 11 is in communication with a sensing system 16. The sensing system 16 may have many different active and passive sensors including the sensor set typically found in a roll stability control or a rollover control system (including lateral accelerometer, yaw rate sensor, steering angle sensor and wheel speed sensor which are equipped for a traditional yaw stability control system) together with a roll rate sensor and a longitudinal accelerometer. The sensing system 16 may also includes object detection sensors, which aid in the detection of an imminent rollover obstacle. An "imminent rollover obstacle" is an object, such as a curb or other object, having a top surface that is above that of the road surface currently being traveled on. An imminent rollover obstacle is also an object for which there is a high probability of the host vehicle colliding therewith and a high probability that such a collision would cause the vehicle to rollover. When a vehicle is experiencing a large roll angle or high lateral slip angle and comes in contact with an imminent rollover obstacle, a rollover may result. The object creates a pivot point upon which a rollover occurs. The various sensors will be further described below and are shown with respect to FIGS. 2 and 4.

The sensors may also be used by the control system 11 in various determinations such as to determine a lifting event, determine a height and position of a mass, etc. wheel speed sensors can be mounted at each corner of the vehicle and generate signals corresponding to the rotational speed of each wheel. The rest of the sensors of the sensing system 16 may be mounted directly on the center of gravity of the vehicle body, along the directions x, y, and z shown in FIG. 1. As those skilled in the art will recognize, the frame from $b_1$, $b_2$, and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. Calculations may take place in an inertial frame 24 that may be derived from the body frame or chassis 22 as described below.

The angular rate sensors and the accelerometers may be mounted on the vehicle car body along the body frame directions $b_1$, $b_2$, and $b_3$ which are the x-y-z axes of the sprung mass of the vehicle.

The longitudinal acceleration sensor is mounted on the car body located at the center of gravity, with its sensing direction along $b_1$ axis, whose output is denoted as $a_x$. The lateral acceleration sensor is mounted on the car body located at the center of gravity, with its sensing direction along $b_2$ axis, whose output is denoted as $a_y$.

FIG. 1 depicts a road frame system $r_1 r_2 r_3$ that is fixed on the driven road surface, where the $r_3$ axis is along the average road normal direction computed from the normal directions of the four-tire/road contact patches.

Figure 2:
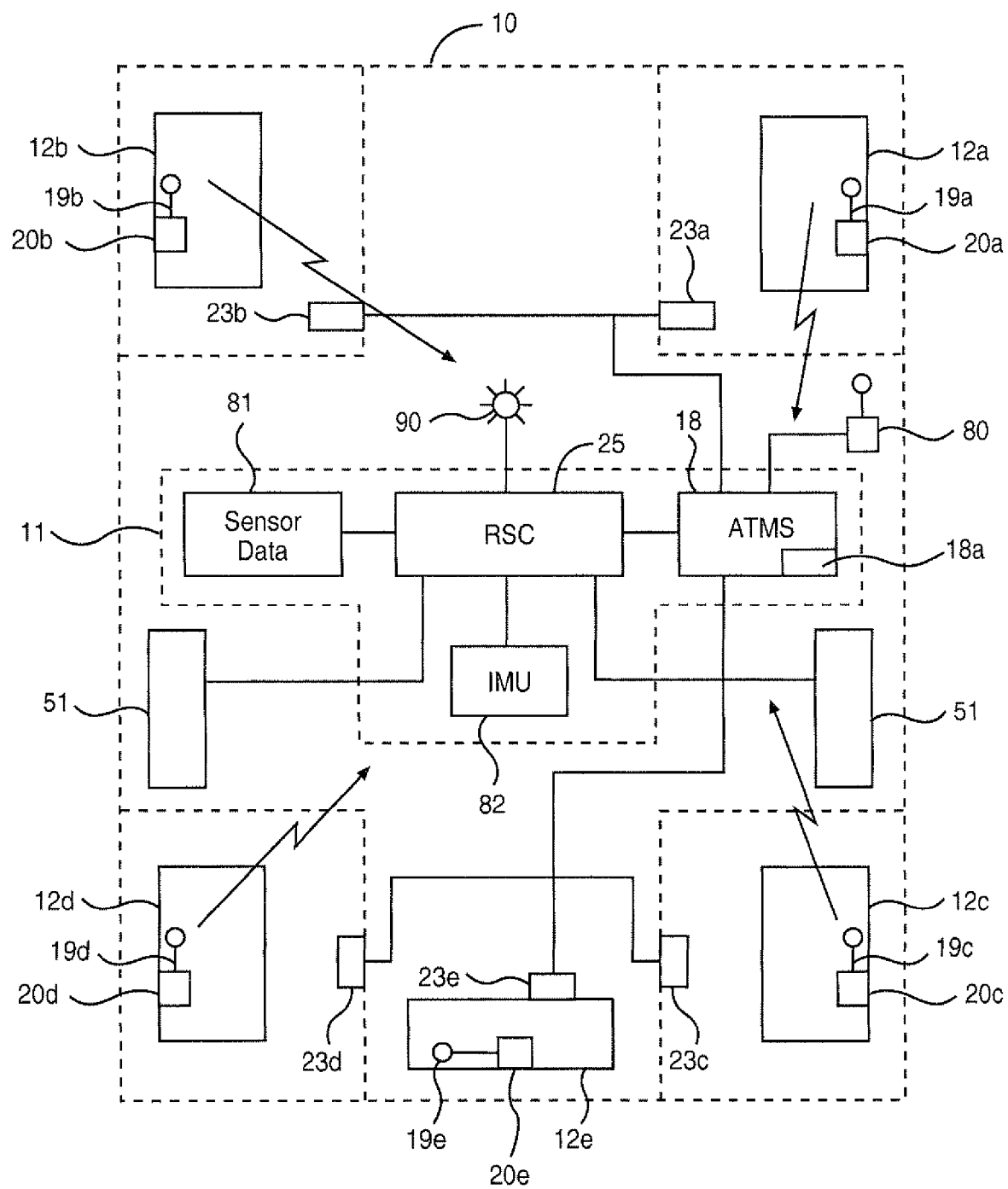
FIG. 2 is a block diagrammatic view of a tire monitoring system in accordance with an embodiment of the present invention.

Referring now to FIG. 2, a block diagrammatic view of an advanced tire monitoring system ATMS 18 for a vehicle 10 in accordance with an embodiment of the present invention is shown. The control system 11 includes a rollover stability control system 25. The control system 11 utilizes tire pressure and acceleration information gathered from the advanced tire monitoring system ATMS 18 in operation of the rollover stability control system 25. A sample advanced tire monitoring system is described in detail with respect to FIGS. 2 and 3. A sample stability control system is described with respect to FIG. 4.

The control system 11 has multiple modes of operation including a normal stability control system operating mode and a tripped rollover stability control system operating mode. While in the normal operating mode, the control system 11 performs similarly and utilizes set parameters that are similar to that of traditional stability control systems. However, upon detection of an imminent tripping obstacle and the generation of a rollover notification signal, the control system 11 operates in the tripped rollover operating mode. In the tripped rollover operating mode the control system 11 operates to mitigate and prevent a vehicle rollover due to the imminent tripping obstacle.

The control system 11 includes one or more controllers. The controllers may be part of the advanced tire monitoring system ATMS 18, the rollover stability control system 25, or may be a stand-alone controller. The rollover stability control system 25 is coupled either directly or through the safety controller to a brake control system (FIG. 4), which includes a brake controller 60 that is used to actuate brakes. The stability control system 25 in response to the tire pressure information may adjust actuation of the brakes accordingly. The tire pressure information may be indicated to a vehicle occupant via an indicator 90.

The stability control system 25 may be or include a RSC system (as shown), an ESC system, an ISC system, a YSC system, a LSC system, or some other stability control system known in the art. Several of the stated control systems are shown and described with respect to FIG. 4. Therein, the control system 11 is illustrated in further detail having a controller 2C, a passive safety system 27-30, multiple active systems 31-34, various vehicle status sensors, and driver or vehicle operator input sensors 20 and 35-47. The passive system 27 includes object detection devices or sensors 28, collision detection sensors 29, and various passive countermeasures 30. The active systems may include a brake control system 31, a steering control system 32, a suspension control system 33, and a drivetrain control system 34. In some instances, the sensors 29 can be considered active, too. Based upon inputs from the sensors, controller 26 controls operation of the safety device 51.

The controllers described herein may be microprocessor based such as a computer having a central processing unit, memory (RAM and/or ROM), and associated input and output buses. The controllers may be application-specific integrated circuits or may be formed of other logic devices known in the art. The controllers may each be a portion of a central vehicle main control unit, an interactive vehicle dynamics module, a restraints control module, a main safety controller, a control circuit having a power supply, combined into a single integrated controller, or may be a stand-alone controller as shown.

Referring again to FIG. 2, the advanced tire monitoring system 18 monitors the air pressure within a right front tire 12a, a left front tire 12b, a right rear tire 12c, and a left rear tire 12d. Each tire 12a-12d has a respective advanced tire monitoring sensor 20a-20d, each of which has a respective antenna 19a-19d. Each tire 12a-12d is positioned upon a corresponding wheel.

A fifth tire or spare tire 12e is also illustrated having an advanced tire monitoring sensor 20e and a respective antenna 119e. Although five wheels are illustrated, the tire pressure and other data of various numbers of tires/wheels may be monitored. For example, the present invention applies equally to vehicles such as pickup trucks that have dual wheels for each rear wheel. Also, various numbers of wheels may be used in a heavy duty truck application having dual wheels at a number of locations. Further, the present invention is also applicable to trailers and extra spares.

Each tire 12 may have a respective initiator 23a-23e positioned within the wheel wells adjacent to the tire 12. Initiator 23 generates a low frequency RF signal initiator and is used to initiate a response from each wheel so that the position of each wheel may be recognized automatically by the ATMS 18. In commercial embodiments where the position programming is done manually, the initiators may be eliminated.

The controller comprising the ATMS 18 may be microprocessor based controller having a programmable CPU that may be programmed to perform various functions and processes including those set forth herein. Controller has a memory 18a associated therewith. Memory 18a may be various types of memory including ROM or RAM. The memory is used to store various thresholds, calibrations, tire characteristics, wheel characteristics, serial numbers, conversion factors, temperature probes, spare tire operating parameters, and other values needed in the calculation, calibration and operation of the ATMS 18. For example, memory may contain a table that includes the sensor identification. Also, the warning status of each of the tires may also be stored within the table.

The ATMS 18 is also coupled to a transceiver 80. Although the transceiver 80 is illustrated as a separate component, the transceiver 80 may also be included within ATMS 18. The transceiver 80 has an antenna associated therewith. The antenna is used to receive pressure and acceleration information from ATMS sensors 20a-20e. One transceiver may be used for all of the ATMS sensors 20, or a front and rear transceiver may be used, or dedicated transceivers may be used, each in communication with the ATMS 18. The ATMS 18 performs preprocessing before placing the tire data on the vehicle communications bus (CAN) or other digital protocol for transmission to the stability control system 25 which is illustrated as a roll stability controller.

In the example, shown, the stability controller 25 is also coupled to a plurality of sensors 81 and other control and measurement systems such as an IMU 82. The sensors 81 may include a barometric pressure sensor, an ambient temperature sensor, an object detection sensor, a speed sensor, a brake pedal sensor, a throttle position sensor, steering wheel sensor, and an ignition sensor. Sensor data may also be provided such as suspension position and loading. Of course, various other types of sensors may be used. A barometric pressure sensor generates a barometric pressure signal corresponding to the ambient barometric pressure. Thus, barometric pressure compensation may be used, but is not required in the calculation for determining the pressure within each tire 12. The ambient temperature signal corresponding to the ambient temperature and may also be used to generate a temperature compensated pressure profile. The sensor data 81 may also be preprocessed before being communicated to the stability control system 25.

The inertial measurement unit (IMU) 82 contains inertial sensors for detecting vehicle yaw, pitch and roll and X, Y, Z axis accelerations. This data is communicated to the stability control system 25 in order to determine whether a rollover condition exists. This data can also act to initiate the ATMS 18 when a potential for rollover exists.

Thus, the control system 11 can generate a first roll condition signal as a function of traditional sensor data 81 and the IMU data 82, and a second roll condition signal as a function of the ATMS data 18. Additionally, the controller 11 can modify the RSC 25 response to a detected rollover event as a function of the ATMS 18 data. For example, low tire pressure may dictate a less aggressive countermeasure scheme.

Safety devices are generally indicated at 51. These may include restraints components such as seat mounted side airbags or side curtain airbags, seat belt pretensioners, deployable trim panels and the like. To prevent or mitigate a tripped rollover event, safety devices 51 may also include vehicle lateral support systems, wheel sets or active suspension components.

Controller 25 may also be coupled to an indicator 90. The indicator 90 may include a video system, an audio indicator, a heads-up display, a flat-panel display, a telematic system, a dashboard indicator, a panel indicator, or other indicator known in the art. In one embodiment of the present invention, the indicator 90 is in the form of a heads-up display and the indication signal is a virtual image projected to appear forward of the vehicle 10. The indicator 90 provides a real-time image of the target area to increase the visibility of the objects during relatively low visible light level conditions without having to refocus ones eyes to monitor an indication device within the vehicle 10. Indicator 90 may provide some indication as to the operability of the system such as confirming receipt of a signal such as a calibration signal or other commands, warnings, and controls. Indicator 90 may also alert the vehicle operator with respect to tire pressure data.

Figure 3:
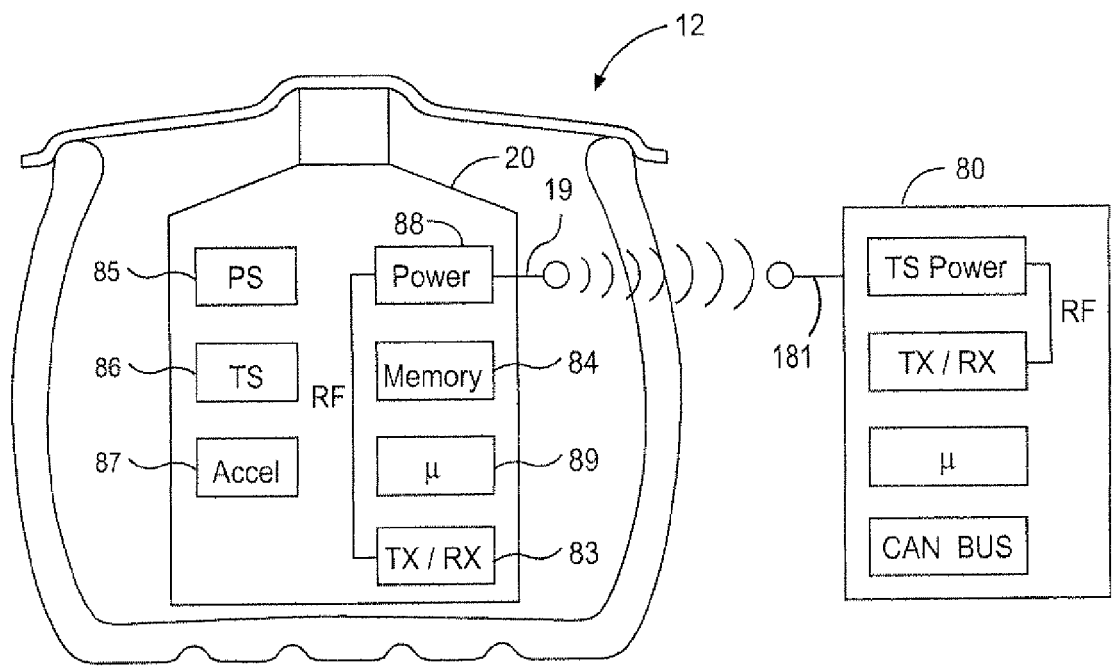
FIG. 3 is a block diagrammatic view of a tire sensor according to an embodiment of the present vehicle control system.

Referring now also to FIG. 3, a schematic view of an ATMS sensor 20 in accordance with an embodiment of the present invention is shown. The ATMS sensor 20 is illustrated mounted to a rim of a vehicle wheel 12 inside the tire. The sensor has a transmitter/receiver or transceiver 83. The transmitter/receiver 83 is coupled to antenna 19 for transmitting various information to transceiver 80. The transmitter/receiver 83 may be used to receive an activation signal from an initiator 23 located at each wheel. The sensor circuit 20 may have various information such as a serial number memory 84, a pressure sensor 85 for determining the pressure within the tire, a temperature sensor 86 for determining the temperature within the tire, and a motion detector in the form of a multi-axis accelerometer 87. The accelerometer may be used to activate the system pressure sensing system. The initial message is referred to as a "wake" message, meaning the pressure sensing circuit is now activated to send its pressure transmissions and the other data.

Each of the transceiver 83, memory 84, pressure sensor 85, temperature sensor 86, and motion sensor 87 are coupled to a power source such as a battery 88. The battery 88 may be a long-life battery capable of lasting the life of the tires.

A sensor function monitor 89 in the form of a microcontroller core or state machine, for example, may also be incorporated into ATMS sensor circuit 20. The sensor function monitor 89 generates an error signal when various portions of the ATMS sensor circuit are not operating or are operating incorrectly. Also, sensor function monitor may generate a signal indicating that the circuit is operating normally.

The transceiver 80 in communication with the ATMS sensor 20, similarly includes a power source, transmitter/receiver device, microcontroller and antenna. It also includes an interface for the vehicle communications bus (CAN bus). Thus, each ATMS sensor 20 communicates wirelessly with the controller 18 for at least a portion of its communication path.

An advantage of the ATMS sensor 20 just described is that it provides temperature and pressure data for each tire, as well as x, y and z acceleration data for each wheel/tire. This acceleration data is generated much more directly than vehicle acceleration data generated by conventional IMU sensing systems. Traditional IMU systems determine roll, pitch and yaw above the vehicle suspension. Thus, signal propagation is delayed and/or modified with other stimuli and transfer functions because of the distance of the signal source, i.e., what is occurring at the contact patches of the tires or to the tires themselves. The ATMS sensors 20 of the present invention reduce the signal propagation path and latency because they are distributed very close to the road surface and other inputs, such as objects impacting the tires.

Figure 4:
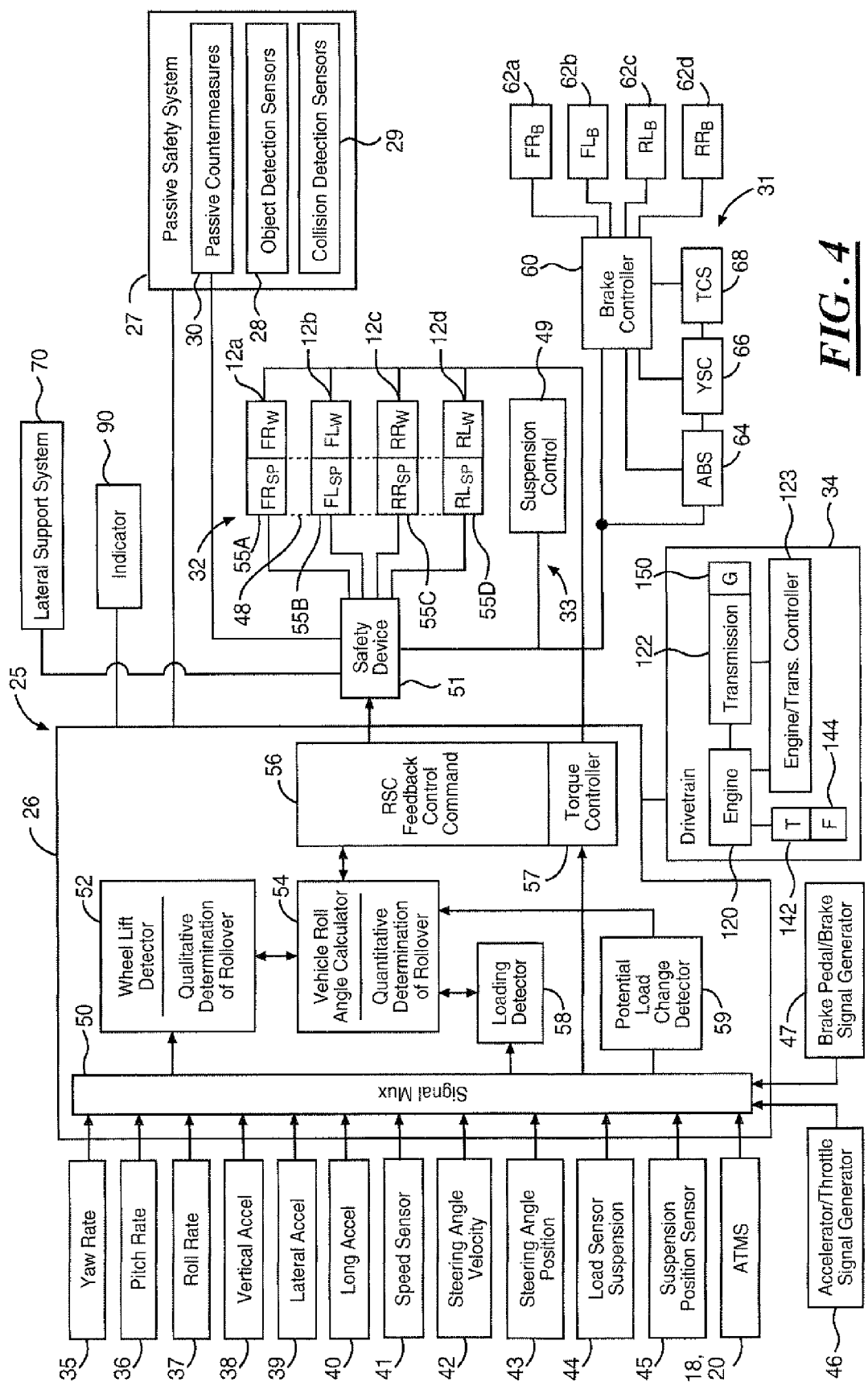
FIG. 4 is a block diagrammatic view of a control system, including a tire monitoring system and a stability control system, for a vehicle in accordance with an embodiment of the present invention.

Referring to FIG. 4, a block diagrammatic view of a stability control system 25 in accordance with an embodiment of the present invention is shown. The stability control system 25 may be part of a vehicle dynamics control or an active safety system. The stability control system 25 may monitor the forces and moments exerted or experienced. Front right (FR) and front left (FL) wheel/tires 12a and 12b and rear right (RR) wheel/tires 12c and rear left (RL) wheel/tires 12d, respectively, are shown and may be part of a vehicle, such as the vehicle 10. The vehicle may also have a number of different types of front steering systems and rear steering systems, including having each of the front and rear wheels configured with a respective controllable actuator, the front and rear wheels having a conventional type system in which both of the front wheels are controlled together and both of the rear wheels are controlled together, or a system having conventional front steering and independently controllable rear steering for each of the wheels or vice versa.

As mentioned above, the system may also be used with other vehicle dynamics controls, such as ride and handling control systems including active/semi-active suspension systems, anti-roll bar, or the other safety systems, such as airbags or passive safety devices deployed or activated upon sensing predetermined dynamic conditions of a vehicle.

The stability control system 25 includes the controller or integrated sensing system (ISS) 26, which signals the safety device 51, the suspension control 49, the engine/transmission controller 123 and the brake controller 60 in response to information received from the ATMS 18, the sensor cluster 50 and various other sensors 58, 59. The brake controller 60, the suspension controller 49 and the lateral support system 70 may be in communication with the controller 26 directly or through the safety device 51.

The controller 26 as well as the suspension control 49, the brake controller 60, and the engine/transmission controller 123 may be microprocessor based such as a computer having a central processing unit, memory (RAM and/or ROM), and associated input and output buses. The controllers 26, 49, 60, and 123 may be application-specific integrated circuits or may be formed of other logic devices known in the art. The controllers 26, 49, 60, and 123 may each be a portion of a central vehicle main control unit, an interactive vehicle dynamics module, a restraints control module, a main safety controller, a control circuit having a power supply, combined into a single integrated controller, or may be a stand-alone controller as shown. The controllers 26, 49, 60, and 123 may be configured to be mounted and located within a vehicle dashboard or vehicle panel or in some other location on the vehicle 10.

The controllers and devices in communication with the ISS 26 are described below. Thereafter, the inputs to the ISS 26 are described.

Referring to FIG. 4, a passive safety system may be in communication with the stability controller or ISS 26. The passive safety system 27 includes collision detection sensors 29, object detection sensors 28, and passive countermeasures 30. The object detection sensors 28 monitor the environment around the vehicle 10 and generate object detection signals upon detection of an object. The object detection sensors 28 may be infrared, visible, ultrasonic, radar, active electro-magnetic wave-ranging, or lidar based, a charged-coupled device, a series of photodiodes, or in some other form known in the art. Wave-ranging devices may include radar, lidar, stereo camera pairs, 3-D imagers, with active infrared illumination, or other wave-ranging devices known in the art. Vision sensors may refer to robotic cameras or other visual imaging cameras. The wave-ranging sensors and the vision sensors may be monocular or binocular and may be used to obtain height, width, depth, range, range rate, angle, and any other visual aspect information. Monocular cameras may be used to obtain less accurate and less reliable range and range rate data as compared to binocular cameras. The object detection sensors 28 may also be in the form of an object indicator. The object detection sensors 28 may be in various locations on the vehicle and any number of each may be utilized. The object detection sensors may also include occupant classification sensors (not shown). With respect to tripped rollover events, object detection sensors 28 detect objects which may cause a tripped rollover.

The collision detection sensors 29 are used to detect a collision and more particularly, a side collision. The collision detection sensors 29 may also be located anywhere on the vehicle 10 and generate collision detection signals in response to a collision. The collision detection sensors 29 may include sensors that are used as vehicle status sensors, such as the yaw rate sensor 35, the lateral acceleration sensor 39, and the longitudinal acceleration sensor 40. The collision detection sensors 29 may also be in the form of an accelerometer, a piezoelectric sensor, a piezo-resistive sensor, a pressure sensor, a contact sensor, a strain gage, or may be in some other form known in the art. The sensors 29 can also be active systems, rather than passive.

The passive countermeasures 30 may include internal air bag control, seatbelt control, knee bolster control, head restraint control, load limiting pedal control, load limiting steering control, seatbelt pretensioner control, external air bag control, pedestrian protection system control, and other passive countermeasures known in the art. Air bag control may include control over front, side, curtain, hood, dash, or other type of airbags known in the art. Pedestrian protection system may include a deployable vehicle hood, a bumper system, or other pedestrian protective devices.

The brake control system 31 can also be in communication with the stability controller 26. The brake control system 31 includes the brake controller 60 that actuates front vehicle brakes 62a and 62b and rear vehicle brakes 62c and 62d. The vehicle brakes 62 are associated with the wheels 12a-12d. The brakes 62 may be independently actuatable through the brake controller 60. The brake controller 60 may control the hydraulic system of the vehicle 10. Of course, electrically actuatable brakes may be used in the present invention. The brake controller 60 may also be in communication with other safety systems such as an antilock brake system 64, a yaw stability control system 66 and a traction control system 68.

The steering control system 32, which may also communicate with the stability controller 26, can include a number of different types of front and rear steering systems including having each of the front and rear wheels 12a-12d configured with respective controllable actuators 55A-D. The wheels 12 may be controlled together or individually. The ISS unit 26 may control the position of the front right wheel actuator 55A, the front left wheel actuator 55B, the rear left wheel actuator 55D, and the right rear wheel actuator 55C. Although as described above, two or more of the actuators may be simultaneously controlled. For example, in a rack-and-pinion system, the two wheels coupled thereto are simultaneously controlled. Based on the inputs from sensors 35-47 and from the ATMS 18, the ISS unit 26 determines a roll condition and/or wheel lift and controls the steering position and/or braking of the wheels.

The stability controller 26 may also communicate with the suspension control system 33. The suspension control system 33 includes the suspension control 49, the suspension 48, and the suspension adjusting elements 55A-55D ($FR_{SP}$, $FL_{SP}$, $RR_{SP}$, $RL_{SP}$) that are associated with each wheel 12. The suspension control 49 and adjusting elements 55A-55D may be used to adjust the suspension 48 to prevent rollover. The adjusting elements 55A-55D may include electrically, mechanically, pneumatically, and/or hydraulically operated actuators, adjustable dampers, or other known adjustment devices, and are described below in the form of actuators.

The stability controller 26 may also be in communication with the drivetrain control system 34. The drivetrain control system 34 includes an internal combustion engine 120 or other engine known in the art. The engine 120 may have a throttle device 142 coupled thereto, which is actuated by a foot pedal 144. The throttle device 142 may be part of a drive-by-wire system or by a direct mechanical linkage between the pedal 144 and the throttle device 142. The engine controller 123 may be an independent controller or part of the controller 26. The engine controller 123 may be used to reduce or increase the engine power. While a conventional internal combustion engine is contemplated, the vehicle 10 could also be powered by a diesel engine or an electric engine or the vehicle could be a hybrid vehicle utilizing two or more types of power systems The drivetrain system 34 also includes a transmission 122, which is coupled to the engine 120. The transmission 122 may be an automatic transmission or a manual transmission. A gear selector 150 is used to select the various gears of the transmission 122. The gear selector 150 may be a shift lever used to select park, reverse, neutral, and drive positions of an automatic transmission. Of course, in the case of electric vehicles, electric motors may replace the conventional engine/transmission setup shown in this example.

Safety device 51 may control one or more passive countermeasures such as airbags 30 or a steering actuator 55A-D at one or more of the wheels 12a, 12b, 12c, 12d of the vehicle. The safety device 51 may also actuate a lateral support system 70.

A lateral support system 70 may also be part of the control system 11 and be in communication with the stability controller 26, either directly or through the safety controller 51. The lateral support system 70 is adapted to mitigate tripped rollover events. It can include a deployable set of linkages and one or more arms, which each have a wheel set attached to the outwardly extending end thereof. The inward end of the arm is attached to a deploying mechanism. The arm may be mechanically released, such that the deploying mechanism includes a spring, which is released when desired. The position of the arm may be systematically, electrically, mechanically, hydraulically, and/or pneumatically actuated and controlled. The arm may also be coupled to a damper to absorb forces applied thereon. The arm is deployed from various sides of the vehicle including the top, side, bottom, front, rear, etc. The wheel sets associated with the arms are mounted in a normally raised position relative to the driving surface wheels 12. In normal driving conditions the wheels sets are not in contact with the driving surface. However, when the vehicle 10 is experiencing a large roll angle, the wheel set near the loaded driving surface wheel comes in contact with and decreases the load on the driving surface wheel. The wheel sets thus have a predetermined driving surface clearance when the vehicle 10 is in a normal operating state. Regardless of whether the trip impending wheel is raised during a tripped rollover event, the omni-directional nature or multi-directional nature of the wheel set allows the vehicle 10 to ride over the imminent tripping obstacle.

The lateral support system 70 may also or alternatively include laterally deployable airbags. The airbags are also outwardly deployed to prevent or mitigate a tripped rollover. The airbags may be deployed from any location on the vehicle 10 and any number of airbags may be utilized.

Indicator 90 may also be in communication with the stability controller 26 directly, or indirectly though the safety controller 51. As noted before, it may be used to indicate to a vehicle operator various vehicle related and status information.

The stability controller 26 receives numerous inputs to aide in determining whether a rollover event is in progress or is imminent. The controller 26 may include a signal multiplexer 50 that receives the signals from the sensors 20 and 35-47. The signal multiplexer 50 provides the signals to a wheel lift detector 52, a vehicle roll angle calculator 54, and to a roll stability control (RSC) feedback control command 56. Also, wheel lift detector 52 may be coupled to the vehicle roll angle calculator 54. The vehicle roll angle calculator 54 may also be coupled to the RSC feedback command 56. The RSC feedback command 56 may include a torque controller 57.

The sensors may also be used by the controller 26 in various determinations, such as to determine a wheel lifting event like an imminent rollover, determine various forces including normal forces at the wheels, determine a height and position of a mass, determine the instability trend of the vehicle dynamics as in unstable roll or yaw motions, determine the intentions of a driver, determine the feedforward control commands to drive actuators, determine feedback control commands for the desired functions, and the like.

The ISS 26 takes advantage of the information provided by the ATMS sensors 20 described above, as well as the traditional vehicle dynamics sensors 35-47 in monitoring for potential rollover events. Thus, the acceleration data, temperature data and pressure data for each wheel is analyzed in a rollover scheme described in further detail with respect to FIG. 6. Heretofore, rollover control systems have not considered coordinate acceleration data at each wheel. Rather, such data was only determined by conventional IMU units, typically with reference to the body center frame, and located above the suspension line of the vehicle.

The vehicle status sensors 35-47 may include the yaw rate sensor 35, the pitch rate sensor 36, the roll rate sensor 37, the vertical acceleration sensor 38, lateral acceleration sensor 39, longitudinal acceleration sensor 40, the speed sensor 41, the steering wheel angle velocity sensor 42, the steering angle (of the wheels or actuator) position sensor 43, the suspension load sensor 44, the suspension position sensor 45, the accelerator/throttle signal generator 46, and the brake pedal/brake signal generator 47. It should be noted that various combinations and sub-combinations of the sensors may be used. The steering wheel angle sensor 42, the accelerator/throttle signal generator 46, and the brake pedal/brake signal generator 47 are considered driver input sensors, since they are associated with a pedal, a wheel, or some other driver input device.

Lateral acceleration, roll orientation and speed may be obtained using a global positioning system (GPS). Depending on the desired sensitivity of the system and various other factors, not all the sensors 35-47 may be used in a commercial embodiment.

Roll angular rate sensor 37 and pitch rate sensor 36 may sense the roll condition or lifting of the vehicle based on sensing the height of one or more points on the vehicle relative to the road surface. Alternatively, the roll rate sensor 37 and pitch rate sensor 36 may be replaced by height-determining sensors. Sensors that may be used to achieve this include but are not limited to a radar-based proximity sensor, a laser-based proximity sensor and a sonar-based proximity sensor. The roll rate sensor 37 may also use a combination of sensors such as proximity sensors to make a roll rate determination.

Roll rate sensor 37 and pitch rate sensor 36 may also sense the roll condition or lifting based on sensing the linear or rotational relative displacement or displacement velocity of one or more of the suspension chassis components. This may be in addition to or in combination with suspension position sensor 45. The suspension position sensor 45, roll rate sensor 37 and/or the pitch rate sensor 36 may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition or lifting may also be sensed by sensing directly or estimating the force or torque associated with the loading condition of one or more suspension or chassis components including a pressure transducer in an active air suspension, a shock absorber sensor such as the load sensor 44, a strain gauge, the steering system absolute or relative motor load, the steering system pressure of the hydraulic lines, a tire lateral force sensor or sensors, a longitudinal tire force sensor, a vertical tire force sensor, or a tire sidewall torsion sensor (although all of which are not shown, one skilled in the art would recognize and readily understand the incorporated use thereof).

The yaw rate sensor 35, the roll rate sensor 37, the lateral acceleration sensor 39, and the longitudinal acceleration sensor 40 may be used together to determine that a single wheel or that two wheels of the vehicle are lifted and the quantitative information regarding the relative roll information between the vehicle body and the moving road plane. Such sensors may be used to determine wheel lift or estimate normal loading associated with wheel lift.

The roll condition such as the relative roll angle of the vehicle body with respect to the road surface or with respect to the sea level may also be established by one or more of the following translational or rotational positions, velocities or accelerations of the vehicle including the roll rate sensor 37, the yaw rate sensor 35, the lateral acceleration sensor 39, the vertical acceleration sensor 38, a vehicle longitudinal acceleration sensor 40, a speed sensor including a wheel-based speed sensor 41 or other radar, sonar, laser, or optical based speed sensors.

A loading detector 58 may also be included in controller 26. The loading detector 58 may be used to determine an additional mass of the vehicle and a distance of the mass.

A potential load change detector 59 may also be included in controller 26. The potential load change detector 59 may qualitatively determine if there was a potential change in load for the vehicle. If the vehicle has stopped and a door/tailgate sensor indicates the door was opened, the load may have changed. Suspension height changes may also indicate the load has changed. This may be obtained using the suspension position sensor 45. The load change may be directly observed at the load sensor 44, if the vehicle is so equipped. Transmission shifting changes depending on the load. Therefore, the transmission controller 123 may output a signal indicating a changed load. The throttle movement from the accelerator pedal or actual throttle itself may be determined at the throttle signal generator 46. The brake signal generator 47 may generate a braking signal. By looking at the trend (more or less force or shorter or longer duration) a load may be determined.

The vehicle dynamic sensors 35-40 may be located at the center of gravity of the vehicle 10. Those skilled in the art will recognize that the sensors may also be located off the center of gravity and translated equivalently thereto.

The speed sensor 41 may be one of a variety of speed sensors known to those skilled in the art. For example, a suitable speed sensor may include a sensor at every wheel that is averaged by controller 26. The controller 26 may translate the wheel speeds into the speed of the vehicle 10. Yaw rate, steering angle, wheel speed and possibly a slip angle estimate at each wheel may be translated back to the speed of the vehicle 10 at the center of gravity. Various other algorithms are known to those skilled in the art. Speed may also be obtained from a transmission sensor (not shown). For example, if speed is determined while speeding up or braking around a corner, the lowest or highest wheel speed may not be used because of its error.

Load sensor 44 may be a load cell coupled to one or more suspension components. By measuring the stress, strain or weight on the load sensor 44 a shifting of the load can be determined.

Although the above discussions are valid for general stability controls, some specific considerations of using them in a rollover stability control application will be discussed. The roll condition of a vehicle during an imminent rollover may be characterized by the relative roll angle between the vehicle body and the wheel axle and the wheel departure angle (between the wheel axle and the average road surface). Both the relative roll angle and the wheel departure angle may be calculated in vehicle roll angle calculator 54 by using the roll rate, lateral acceleration sensor signals and the other available sensor signals used in the ISS unit 26. If both the relative roll angle and the wheel departure angles are large enough, the vehicle may be in either single wheel lifting or double wheel lifting. On the other hand, if the magnitude of both angles is small, the wheels are likely all grounded; therefore the vehicle is not rolling over. In case that both of them are not small and the double wheel lifting condition is detected or determined (see for example U.S. Pat. No. 6,904,350), the sum of those two angles will be used to compute the feedback commands for the desired actuators so as to achieve rollover prevention. The variables used for this purpose might be included in the ISS unit 26.

The roll information of a vehicle during an imminent rollover may be characterized by rolling radius-based wheel departure roll angle, which captures the angle between the wheel axle and the average road surface through the dynamic rolling radii of the left and right wheels when both of the wheels are grounded. Since the computation of the rolling radius is related to the wheel speed and the linear velocity of the wheel, such rolling-radius based wheel departure angle will assume abnormal values when there are large wheel slips. This happens when a wheel is lifted and there is torque applied to the wheel. Therefore, if this rolling radius-based wheel departure angle is increasing rapidly, the vehicle might have lifted wheels. Small magnitude of this angle indicates the wheels are all grounded. The variables used for this purpose might be included in the ISS unit.

The roll condition of the vehicle during an imminent rollover may be seen indirectly from the wheel longitudinal slip. If during a normal braking or driving torque the wheels at one side of the vehicle experience increased magnitude of slip, then the wheels of that side are losing longitudinal road torque. This implies that the wheels are either driven on a low mu surface or lifted up. The low mu surface condition and wheel-lifted-up condition may be further differentiated based on the chassis roll angle computation, i.e., in low mu surface, the chassis roll angle is usually very small. The variables used for this purpose might be included in the ISS unit.

The roll condition of the vehicle during an imminent rollover may be characterized by the normal loading sustained at each wheel. Theoretically, when a normal loading at a wheel decreases to zero, the wheel is no longer contacting the road surface. In this case a potential rollover is underway. Large magnitude of this loading indicates that the wheel is grounded. Normal loading is a function of the calculated chassis roll and pitch angles. The variables used for this purpose might be included in the ISS unit.

The roll condition of a vehicle during imminent rollover may be identified by checking the actual road torques applied to the wheels and the road torques, which are needed to sustain the wheels when they are grounded. The actual road torques may be obtained through torque balancing for each wheel using wheel acceleration, driving torque and braking torque. If the wheel is contacting the road surface, the calculated actual road torques must match or be larger than the torques determined from the nonlinear torques calculated from the normal loading and the longitudinal slip at each wheel. The variables used for this purpose might be included in the ISS unit.

The roll condition of a vehicle during an imminent rollover may be characterized by the chassis roll angle itself, i.e., the relative roll angle between the vehicle body and the wheel axle. If this chassis roll angle is increasing rapidly, the vehicle might be on the edge of wheel lifting or rollover. Small magnitude of this angle indicates the wheels are not lifted or are all grounded. Therefore, an accurate determination of the chassis roll angle is beneficial for determining if the vehicle is in non-rollover events and such computation is conducted in the VRAC unit 54 and in the ISS unit 26.

The roll condition of a vehicle during imminent rollover may also be characterized by the roll angle between the wheel axle and the average road surface, which is called a wheel departure angle (WDA). If the roll angle is increasing rapidly, the vehicle has lifted wheel or wheels and aggressive control action needs to be taken in order to prevent the vehicle from rolling over. Small magnitude of this angle indicates the wheels are not lifted. The variables used for this purpose might be included in the ISS unit 26.

Figure 5:
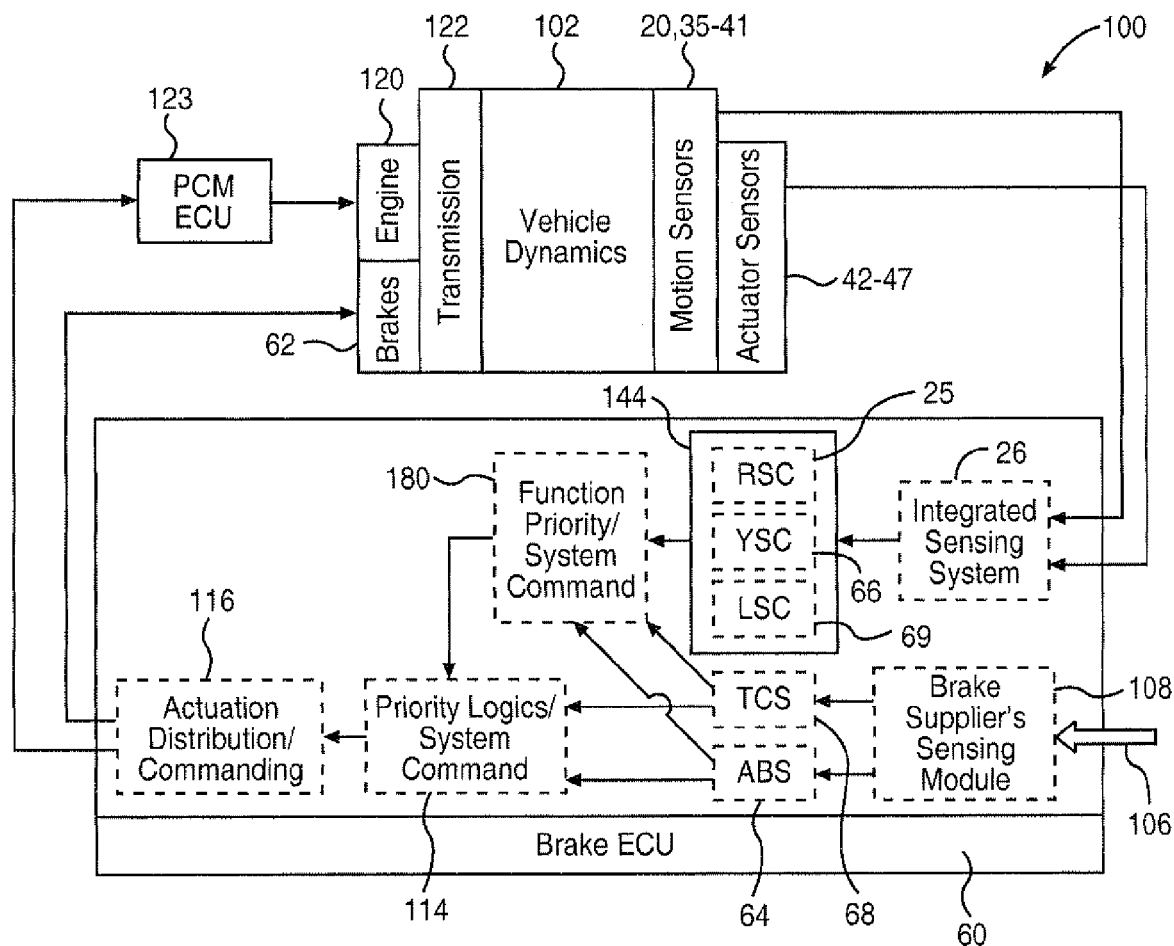
FIG. 5 is a block diagrammatic view illustrating interrelationships among various units within a control system for controlled vehicle dynamics in accordance with an embodiment of the present invention.

Referring now to FIG. 5, a block diagrammatic view illustrating interrelationships among various units within a control system 100 for controlled vehicle dynamics in accordance with an embodiment of the present invention is shown. The vehicle dynamics is represented by the module 102. The vehicle dynamics 102 includes the angular and translation movements of a vehicle. The motion and actuation sensors 20, 35-47 generate signals corresponding to the vehicle dynamics and the actions of the various actuators. The sensors are fed into the ISS unit 26. The sensor signals and the calculated signals from a system other than ISS (for example, the brake supplier's own brake control computations) 106 may be fed into to sensing module 108. The ISS unit 26 is coupled to the Integrated Stability Control System (ISCS) unit 144 and may specifically be coupled to the RSC function module 25 and the YSC function module 66. A function priority system command 180 may also be included. The output of the TCS module 68 and the ABS module 64 may be coupled to priority logic system command 114, which in turn is coupled to the actuation distribution and commanding block 116. The actuation distribution commanding block 116 is coupled to the powertrain control module PCM ECU 123 and to the brakes 62. The powertrain control module 123 may be coupled to the engine 120 and transmission 122. The actuation of the engine, the brakes and the transmission may affect the vehicle dynamics 102, which in turn is sensed by the various sensors. Thus, as can be seen, a continuous loop of sensing and controlling with respect to the vehicle dynamics is illustrated.

Figure 6:
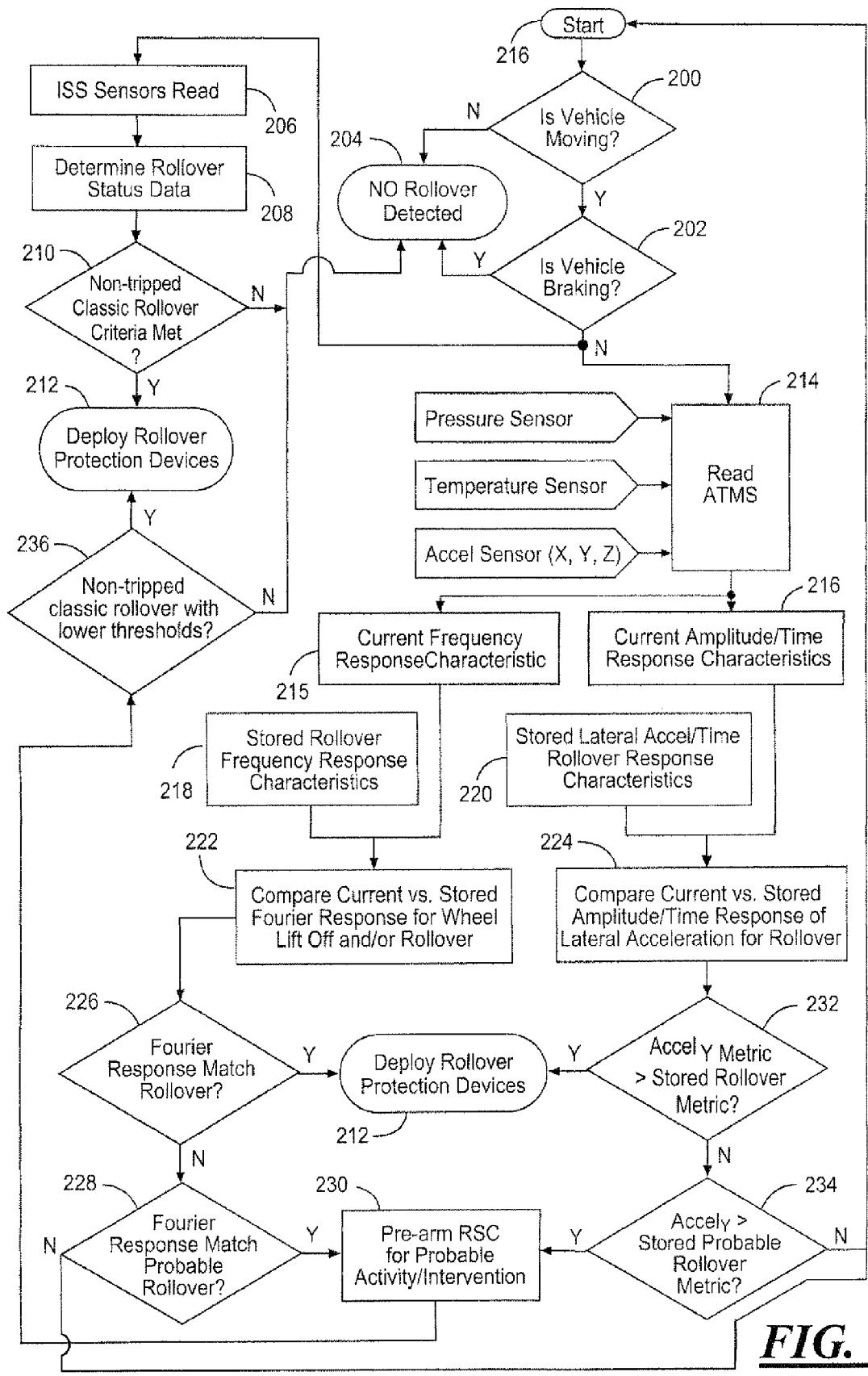
FIG. 6 is a logic flow diagram illustrating a method of operating a control system or a stability control system of a vehicle in accordance with an embodiment of the present invention.

Referring now to FIG. 6, a logic flow diagram illustrating a method of operating a stability control system of a vehicle in accordance with an embodiment of the present invention is shown. Although the following steps are described primarily with respect to the embodiments of FIGS. 1-5, they may be modified and applied to other embodiments of the present invention.

The routine starts at steps 200 and 202 by determining whether the vehicle is moving or braking. If the vehicle is moving, but not braking, the logic continues. Otherwise, no rollover event is declared in step 204.

In step 206, various sensor signals are generated from sensors, such as by the vehicle status sensors 20 and 35-47, passive safety system sensors 28 and 29, active safety system sensors, which may share sensors 20, 28, 29, and 35-47, and the like or in response thereto. To name a few, a longitudinal acceleration signal, a lateral acceleration signal, a yaw rate signal, a steering angle, velocity, and a roll rate signal are generated. A collision status signal can also be generated from collision detection sensors 29. Object detection signals can also be generated from the object detection sensors 28.

In step 208, rollover status data is generated. This includes calculating values for parameters to be used by a rollover detection routine. Thus, some or all of the following values are determined from the data sensed in step 206: side slip angle and rate, the roll angle, lateral velocity, and lateral kinetic energy.

In step 210, a conventional rollover analysis is performed based upon the vehicle dynamics data collected in step 206 and calculated in step 208. This corresponds to determining a first roll condition signal for the vehicle based upon traditional rollover sensing. This can be a non-tripped rollover determination. Thus, the control system, in response to the sensor signals, determines whether an unstable event or a potential rollover event for a current moment in time exists. If the current status and conditions of the vehicle are such that a rollover event may occur, the control system performs stability control system tasks in response to the detected unstable event in step 212. Otherwise, the system returns to continue monitoring the sensor data.

In step 212, the stability control tasks which may be performed if the vehicle is experiencing an non-tripped rollover event include, but are not limited to braking one or more of the wheels, modifying the torque applied to the wheels, or adjusting the suspension by the suspension actuators 55.

Figure 7:
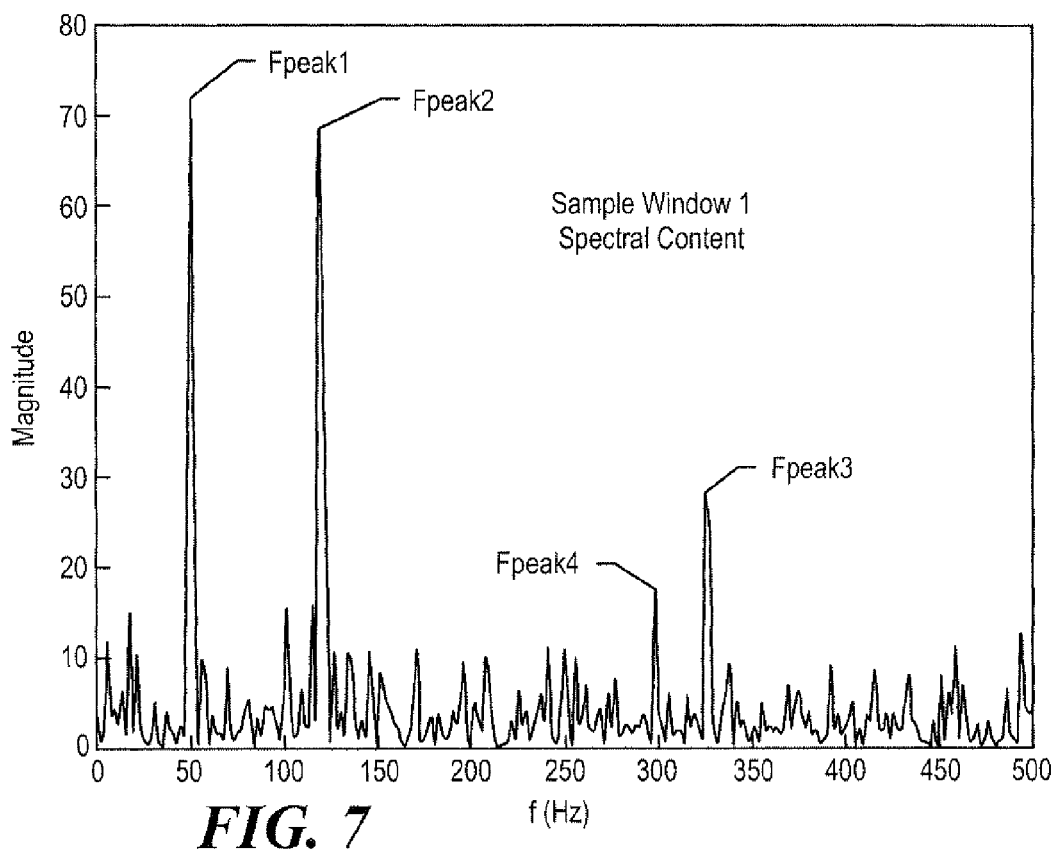
FIG. 7 is a graphical representation of ATMS sensor magnitude-frequency response data.
Figure 8:
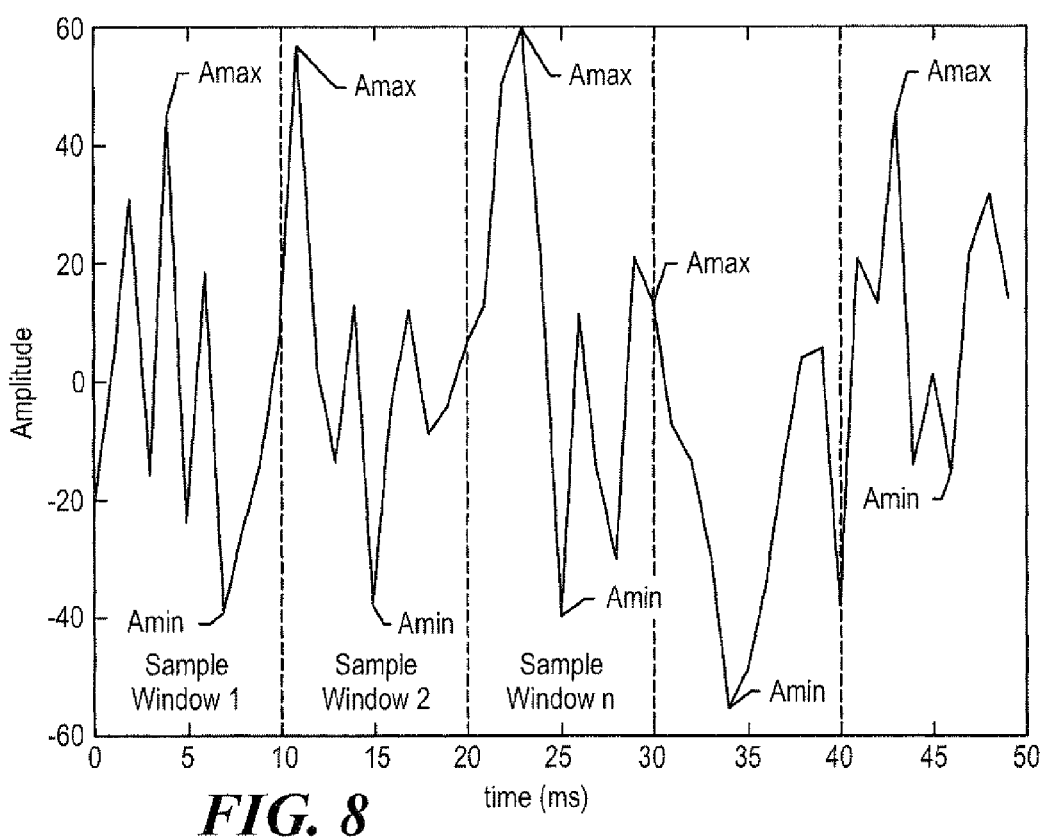
FIG. 8 is a graphical representation of ATMS sensor amplitude-time response data.

The ATMS-based rollover detection routine begins in step 214. In step 214, tire signals are generated, which are indicative of the current tire pressure, temperature and accelerations within each tire of the vehicle. This information is provided by the ATMS sensors 20 and the ATMS controller 18. Steps 215 and 216 preprocess the data generated by the ATMS sensors 20. Block 215 converts the signals to the frequency domain and performs a spectral analysis. In block 215 the data is segmented and parsed into discrete time windows and transformed from the time domain into the frequency domain using the Fourier Transform (FT) techniques. Alternate embodiments may use other frequency transformation techniques such as wavelet transformation techniques to transform the time domain data into its frequency domain representation. Also in block 215 a signal magnitude vs. frequency table is generated for each time window as shown in FIG. 7. The generated tables are used in the subsequent algorithm blocks and are compared to known stored rollover frequency response characteristic tables to determine the current conditions. Block 216 generates a current amplitude and time response signature for the ATMS data. In block 216 the signal amplitude-time data is parsed into discrete time windows and signal amplitude vs. time table is generated for each time window for each of the sensor data as shown in FIG. 8. The generated tables are used in the subsequent algorithm blocks and are compared to known stored rollover response characteristic conditions tables to determine the current rollover conditions. As mentioned above, because the data is generated inside each tire for the vehicle, the signature profiles of the sensor data provide direct insight into what each tire is experiencing while it contacts the road surface. This data is generated much more directly than vehicle acceleration data generated by conventional IMU sensing systems because traditional IMU systems determine roll, pitch and yaw and coordinate accelerations above the vehicle suspension. The ATMS sensors 20 eliminate signal propagation through the suspension, and provide a clearer "view" of the vehicle dynamics.

The preprocessed ATMS sensor data is then analyzed according to rollover detection criteria. This corresponds to determining a second roll condition signal for the vehicle based upon the sensed tire data. This may correspond to a tripped rollover event. In this example, the sensor signals are compared to stored rollover frequency signatures from block 218 in step 222, and compared to stored rollover amplitude/time response signatures from block 220 in step 224.

If the current frequency response characteristic matches the stored frequency response characteristic indicative of a rollover event in step 226, a rollover event is declared at block 212. Otherwise, a further analysis in step 228, determines whether the frequency response characteristic is indicative of a probable rollover event. If a rollover event is likely, interventions can be pre-armed to respond accordingly at 230.

Similarly, if a comparison of the lateral acceleration amplitude/time response based rollover metric is greater than the corresponding rollover metric in step 232, a rollover event is declared at 212. If no rollover event is declared, step 234 analyzes whether a rollover event is likely. Again, if so, appropriate pre-arming steps may be taken at block 230.

if the ATMS-sensor-based rollover criteria are satisfied in step 226 or 232, rollover protection devices are deployed in step 212. The rollover countermeasures may be the same or different than the rollover countermeasures taken as a result of a rollover declaration in step 210. In one example, for a non-tripped rollover event declared from step 226 or 232, the thresholds that are used in activating or initiating interventions as performed in step 212 are adjusted, scaled, opened, or relaxed, depending upon the tire pressures and/or the level of tire debeading risk, to alter intervention timing. For example, for lower tire pressures, earlier interventions may be desired. Thus, the first rollover condition signal may be modified by the signal generated as a function of the ATMS data.

For a tripped rollover event declared from step 226 or 232, the interventions deployed in step 212 may also be the same or different than the rollover countermeasures taken as a result of a rollover declaration in step 210. Different, or additional countermeasures may include deploying the lateral support system 70 to mitigate or eliminate the effects of the tripping obstacle. Active steering may be another tripping event countermeasure.

If steps 226, 232 do not declare a rollover event (either tripped or non-tripped) from the ATMS sensor data, the ATMS sensor data is still analyzed at step 228 and 234 to determine whether it may affect the deployment of countermeasures. Thus, a pre-arm signal based upon the ATMS data may be generated. If the ATMS sensor data indicates that a wheel is at adequate temperature and pressure, the system will pre-arm the intervention criteria in block 230 as normal. Otherwise, the pre-arming may be modified or adjusted as mentioned above. Pre-arming would be appropriate for the roll stability control system as well as the restraints control system.

For example, the brake pressure applied during intervention may be adjusted based on the tire pressure information and the other sensor information. For instance, the brake pressure may be tiered based on the pressure at each tire: full range or maximum tire pressure range, a reduced range or brake pressure limiting range, and an inactive range or brake pressure prevented range. When the tire pressure of a tire of concern is in the first range or greater than or equal to a first tire pressure threshold value, the control system may apply a brake pressure up to a maximum threshold. In the full range brake control functions are maintained. When the tire pressure of a tire of concern is in the reduced range or between the first tire threshold TPT1 and the second tire threshold TPT2, the control system may apply a reduced or limited brake pressure, which is less than that which would normally be applied if the tire pressure were greater than the first tire threshold TPT1. In the reduced range the amount that the brake pressure is limited is gradually or progressively increased. This increase may be linear, may be non-linear, or may result using some other relationship. When the tire pressure of a tire of concern is less than or equal to the second tire threshold TPT2, the control system is prevented from applying brake pressure. Although the control system is prevented from applying a brake pressure, brake pressure may be applied manually by a vehicle operator. In another embodiment, the control system overrides the manual brakes and limits or prevents manual brake pressure.

The brake pressure limitation function may be derived using tire-debeading information. The debeading information may be tire specific or may include a safety factor to account for various tires or tires in general. The tire-debeading information may also include a point or points at which tire-debeading risk increases, which may be in association with a maximum braking torque. The brake pressure limitation function may include a tire-debeading factor, which is associated with the amount that brake pressure is limited based on the tire-debeading information. For example, for a particular situation and event and tire pressure, the brake pressure to be applied may be reduced by the tire-debeading factor.

In step 236, a similar analysis to that performed in step 210 is carried out. However, in step 236, the vehicle dynamic data is analyzed to determine whether a non-tripped rollover event is imminent with lowered thresholds, as dictated by the ATMS sensor data. Again, because longer lead times may be necessary to deploy countermeasures when the wheel performance is compromised, the thresholds for declaring a rollover event must likewise be lowered.

In one example situation and during a particular dynamic maneuver that requires stability control, a tire may be on the "outside" or "inside" of a turn. If the outside front tire has low pressure, control parameters may be adjusted such that the control entry criteria is lowered and the control gains are reduced to yield early and smooth control. If the outside rear tire has low pressure, the sideslip control thresholds are tighten, to allow less destabilizing sideslip. The control system should rely on less braking but more aggressive powertrain deceleration to reduce the speed without yielding potential oversteer.

In another example situation and control event for a vehicle having properly inflated outside tires, but one or more underinflated inside tires, the stability control interventions are not adjusted to prevent debeading. However, reference velocity calculations associated with the inside tires are scaled with tire pressure. As tire pressure decreases, the effective rolling radius decreases. Therefore, for a given speed, the wheel and tire rotates faster.

During transitional maneuvers, inside tires can quickly become outside tires and vice versa. Therefore, if the transition is aggressive, yielding sideslip, a low-pressure tire on the inside of a turn can soon become an outside tire at risk of debeading. Transition maneuvers can be identified in advance using sensed steering, yaw rate, roll rate, lateral acceleration, and wheel speed information. Once identified, tighter sideslip control thresholds can be set to allow less destabilizing sideslip.

In step 212, the control system may also indicate via an indicator, such as the indicator 90 (FIG. 4), to a vehicle operator the pressure of the tires and/or the status of each tire. The control system may indicate that a tire pressure is low and the extent thereof. This information may also be stored, viewed, and downloaded for future review and/or evaluation. The viewing and downloading may be to an offboard or offsite system. In step 212, the control system may indicate via an indicator, such as the indicator 90, to a vehicle operator that active tasks are being performed and the status of the vehicle. This indicated information may also be stored, viewed, and downloaded for future review and/or evaluation. The viewing and downloading may be to an offboard or offsite system.

The above tasks may be performed via any one or more of the herein mentioned controllers, control systems, stability control systems, or the like.

The above-described steps are meant to be illustrative examples; the steps may be performed sequentially, synchronously, simultaneously, or in a different order depending upon the application.

While particular embodiments of the invention have been shown and described, numerous variations and alternate embodiments will occur to those skilled in the art. Accordingly, it is intended that the invention be limited only in terms of the appended claims.

What is claimed is:

1. A control system for a vehicle comprising:
   a tire sensor located within a wheel of the vehicle and generating a tire signal comprising pressure, temperature and acceleration data;
   at least one vehicle dynamics sensor generating a sensor signal;
   a rollover control system; and
   a controller communicating with the tire sensor and the at least one vehicle dynamics sensor, the controller generating a first roll condition signal as a function of the sensor signal, and a second roll condition signal as a function of the tire signal, the first or second roll condition signals controlling the rollover control system to mitigate a vehicle rollover event.

2. A control system according to claim 1 wherein the first roll condition signal comprises a non-tripped rollover event.

3. A control system according to claim 1 wherein the second roll condition signal comprises a tripped rollover event.

4. A control system according to claim 1 wherein the controller generates the second roll condition signal as a function of the tire signal by comparing frequency response characteristics of the tire signal to stored frequency response characteristics indicative of a rollover event.

5. A control system according to claim 1 wherein the controller generates the second roll condition signal as a function of the tire signal by comparing amplitude response characteristics of the tire signal to stored amplitude response characteristics indicative of a rollover event.

6. A control system according to claim 4 wherein the controller further generates the second roll condition signal as a function of the tire signal by comparing amplitude response characteristics of the tire signal to stored amplitude response characteristics indicative of a rollover event.

7. A control system according to claim 1 wherein the second roll condition signal comprises a pre-arm roll condition signal.

8. A control system according to claim 7 wherein the pre-arm roll condition signal modifies control of the rollover control system in the presence of the first roll condition signal to mitigate a vehicle rollover event.

9. A control system according to claim 8 wherein the pre-arm roll condition signal modifies control of the rollover control system by lowering thresholds indicative of a rollover event.

10. A control system according to claim 7 wherein the controller generates the first roll condition signal as a function of the sensor signal and pre-arm roll condition signal.

11. A control system according to claim 1 comprising a tire sensor associated with each vehicle wheel.

12. A control system according to claim 1 wherein the controller communicates with the tire sensor by wireless transmission.

13. A control system according to claim 1 further comprising an indicator for signaling activation of the rollover control system.

14. A control system for a vehicle comprising:
    a tire sensor located within a wheel of the vehicle and generating a tire signal comprising pressure, temperature and acceleration data;
    at least one vehicle dynamics sensor generating a sensor signal;
    a stability control system;
    at least one brake coupled to the stability control system and associated with the wheel of the vehicle; and
    a controller coupled to the at least one vehicle dynamics sensor and the tire sensor, the controller having a plurality of tire pressure associated brake control ranges, detecting an unstable event in response to the sensor signal and the tire signal, and applying a brake pressure in response to the tire signal and the plurality of tire pressure associated brake control ranges via the stability control system.

15. A system as in claim 14 wherein the plurality of tire pressure associated brake control ranges comprises:
    a full brake control range;
    a reduced brake control range; and
    an inactive brake control range.

16. A system as in claim 14 wherein the controller maintains full brake control functions when the tire pressure signal is greater than a threshold.

17. A system as in claim 14 wherein the controller determines a slip level of at least one wheel of the vehicle from the tire signal, and in response thereto, adjusts the applied brake pressure.

18. A system as in claim 14 wherein the at least one vehicle dynamics sensor is selected from an acceleration sensor, a roll rate sensor, a yaw rate sensor, and a pitch rate sensor.

19. A control system for a vehicle comprising:
    a tire sensor located within each wheel of the vehicle and generating a tire signal comprising pressure, temperature and acceleration data;
    at least one vehicle dynamics sensor generating a sensor signal;
    a rollover control system; and
    a controller wirelessly communicating with each tire sensor and the at least one vehicle dynamics sensor, the controller generating a first roll condition signal as a function of the sensor signal, and a second roll condition signal as a function of the tire signal, the first or second roll condition signals controlling the rollover control system to mitigate a vehicle rollover event,
    wherein the controller generates the second roll condition signal as a function of the tire signal by comparing frequency response characteristics of the tire signal to stored frequency response characteristics indicative of a rollover event, or by comparing amplitude response characteristics of the tire signal to stored amplitude response characteristics indicative of a rollover event.

20. A control system according to claim 19 wherein the second roll condition signal comprises a pre-arm roll condition signal.

21. A control system according to claim 20 wherein the pre-arm roll condition signal modifies control of the rollover control system in the presence of the first roll condition signal to mitigate a vehicle rollover event.

22. A control system according to claim 20 wherein the controller generates the first roll condition signal as a function of the sensor signal and pre-arm roll condition signal.

* * * * *